United States Patent
Kitamura et al.

(10) Patent No.: US 6,930,962 B2
(45) Date of Patent: Aug. 16, 2005

(54) OPTICAL INFORMATION READING APPARATUS WITH SUPER-RESOLUTION CUT-OFF FILTER

(75) Inventors: Atsushi Kitamura, Iwata-gun (JP); Kozo Matsumoto, Iwata-gun (JP); Mizuki Nakamura, Iwata-gun (JP); Motoji Egawa, Iwata-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 429 days.

(21) Appl. No.: 10/237,686

(22) Filed: Sep. 10, 2002

(65) Prior Publication Data

US 2003/0048704 A1 Mar. 13, 2003

(30) Foreign Application Priority Data

Sep. 13, 2001 (JP) .......................... 2001-278045

(51) Int. Cl.[7] .......................... G11B 7/095; G11B 7/135
(52) U.S. Cl. .......................... 369/44.23; 369/112.22; 369/112.06
(58) Field of Search .......................... 369/112.06, 112.22, 369/44.23, 112.01, 112.05, 112.28, 112.29, 112.03, 44.14, 118

(56) References Cited

U.S. PATENT DOCUMENTS 6,660,986 B2 * 12/2003 Matsumoto et al. ..... 250/201.5

FOREIGN PATENT DOCUMENTS

JP 08077592 A * 3/1996 .......... G11B/7/135

* cited by examiner

Primary Examiner—W. R. Young
Assistant Examiner—Van Pham
(74) Attorney, Agent, or Firm—Oliff & Berridge PLC

(57) ABSTRACT

An optical information reading apparatus includes a semiconductor laser, a beam splitter, a collimating lens, a super-resolution cut-off filter, an objective lens having a high numerical aperture, and a photodetector. The super-resolution cut-off filter is disposed immediately in front of the incident side of the objective lens. The photodetector is a well-known eight-division photodetector with a signal processing circuit, reads recorded information and also outputs tracking and focusing control signals to a control circuit. The laser beam is separated into a 0-th order laser beam and ± primary laser beams, which are made incident on the objective lens, pass therethrough, and are made incident on the recording surface of a disk. The 0-th order laser beam is used to read information and to control focussing while the ± primary laser beams are used to control tracking.

5 Claims, 4 Drawing Sheets

(ENLARGED VIEW)

OPTICAL INFORMATION READING APPARATUS WITH SUPER-RESOLUTION CUT-OFF FILTER

BACKGROUND OF THE INVENTION

1. Field of the Invention

The present invention relates to an optical information reading apparatus, and particularly to an optical information reading apparatus suitable for reading information on a recording medium with a high density.

2. Description of the Related Art

Recently, DVDs (digital video disks) having a recording capacity about 7 times as large as that of CDs (compact disks) have been widely used to meet the demand for an increased recording capacity. Increase in recording capacity means improvement of the recording density, which depends upon the number of recording pits formed on a recording medium (hereinafter referred to as disk). In DVDs, one way for increasing the recording density is to decrease the size of a recording pit, that is, reduce the diameter of the spot of a laser beam radiated on the disk.

The size of a micro spot radiated on the disk is proportional to the wavelength of a laser beam and is inversely proportional to the numerical aperture of an objective lens. In order to reduce the diameter of the spot, therefore, it is necessary to decrease the wavelength of the laser beam and/or to increase the numerical aperture of the objective lens. However, when the numerical aperture of the objective lens is increased, the converging state of a laser beam deteriorates due to coma aberration with respect to the inclination of the optical disk. Since coma aberration is proportional to the third power of the numerical aperture of the objective lens and to the thickness of a disk substrate, DVDs are designed to have a disk substrate thickness of 0.6 mm, which is half that of CDs.

Reading out information requires a tracking servo to trace the track formed on the disk, and a focusing servo to follow defocusing caused due to the vertical movement of the disk. In order to read information from a disk such as a write-once-read-many optical disk or a phase transition optical disk, which is formed with grooves and portions therebetween pre-wobbled, it is necessary to perform an accurate tracking servo operation, which is performed predominantly by a DPP (differential push-pull) method which reduces track offset caused due to the inclination of the disk. The DPP method uses two sub-beams in addition to a main beam from a semiconductor laser to perform the tracking servo operation, thus requiring a diffraction grating for generating sub-beams.

FIG. 7 is a block diagram showing the main section of a conventional optical information reading apparatus. The conventional optical information reading apparatus comprises a semiconductor laser 1B, a diffraction grating 20, a beam splitter 3, a collimating lens 4, a reflecting mirror 5, an actuator 9, and a photodetector 2. The actuator 9 comprises an objective lens 8 and a control circuit 21, and is moved by a driving means (not shown) relative to the surface of a disk (not shown) disposed above the objective lens 8. A laser beam is converged onto the surface of the disk (not shown) by the objective lens 8. The photodetector 2 is a well-known eight division photodetector with a signal processing circuit.

The above-described optical information reading apparatus operates as follows. A laser beam emitted from the semiconductor laser 1B and having a wavelength appropriate to a disk used is separated into a 0-th order laser beam and ± primary laser beams by the diffracting grating 20. The 0-th order laser beam and the ± primary laser beams travel via the beam splitter 3, the collimating lens 4 and the reflecting mirror 5, are incident on the objective lens 8 and converged thereby onto the disk (not shown). The 0-th order laser beam and the ± primary laser beams converged onto the disk (not shown) are reflected thereat, take the incoming path backward, and are made incident on the beam splitter 3. These reflected laser beams incident on the beam splitter 3 pass therethrough, are made incident on the photodetector 2, and separately converted thereby into electrical signals using a well-known method such that the 0-th order laser beam is converted into recorded information and focusing control signals while the ± primary laser beams are converted into a tracking control signal. The disk is controlled by a well-known control circuit, and the signals are read out by a well-known signal processing circuit (both circuits not shown).

In such a conventional optical information reading apparatus, the following problems have been involved. The laser beam emitted from the semiconductor laser 1B is separated into a 0-th order laser beam and ± primary light beams by the diffracting grating 20. However, the diffracting grating 20 has a pitch distance as small as 20 $\mu$m and therefore is difficult to produce, thereby making the production cost high. Furthermore, the wavelength of the semiconductor 1B must be matched with a high-density disk, making densification difficult.

SUMMARY OF THE INVENTION

Accordingly, it is an object of the present invention to solve the above-described problems to thereby provide an optical information reading apparatus which is inexpensive and complies with the densification of a disk.

In order to achieve the above-described object, the present invention provides an optical information reading apparatus, which comprises: a semiconductor laser; a beam splitter adapted to split a laser beam emitted from the semiconductor and a reflected laser beam returning from a disk; a collimating lens adapted to change a diffusion angle of the laser beam; a super-resolution cut-off filter adapted to separate the laser beam into a 0-th order laser beam and ± n-th order laser beams; an objective lens positioned immediately after the super-resolution cut-off filter, having a numerical aperture appropriate for reading information recorded on the disk, and adapted to converge the 0-th order laser beam and the ± n-th order laser beams generated by the super-resolution cut-off filter onto the disk; and a photodetector for detecting the reflected light beam from the disk; and in which the ± n-th order laser beams generated by the super-resolution cut-off filter are utilized to perform a tracking control. This enables the optical information reading apparatus to better comply with a disk with a further increased density and to be produced less expensively than the apparatus using the diffraction grating.

In the optical information reading apparatus according to the present invention, preferably, the super-resolution cut-off filter has on its central portion a reflecting means comprising an annular portion and a straight portion substantially corresponding to an inner diameter of the annular portion. This enables the laser beam to be easily separated into the 0-th order laser beam and the ± n-th order laser beams.

In the optical information reading apparatus according to the present invention, preferably, the super-resolution cut-off filter has two anti-reflection films comprising a single-layer or multilayer of a dielectric material and formed on its both side surfaces such that one is formed entirely on one side surface and the other is formed partly on the other side surface, specifically, formed at portions except the annular and straight portions constituting the reflecting means, on which a metallic reflection film, or a reflection or absorption film of a dielectric material is provided. This also enables the laser beam to be easily separated into the 0-th order laser beam and the ± n-th order laser beams.

In the optical information reading apparatus according to the present invention, preferably, ± primary laser beams generated by the super-resolution cut-off filter are utilized to perform the tracking control. This enables the optical information reading apparatus to be duly controlled with a smaller number of photodetectors.

The above and other objects, features, and advantages of the present invention will be clear from the following detailed description of the preferred embodiments of the invention in conjunction with the accompanying drawings.

BRIEF DESCRIPTION OF THE DRAWINGS

FIGS. 3A to 3F are characteristic views showing the effects of the super-resolution cut-off filter, wherein FIGS. 3A, 3B and 3C are views three-dimensionally representing laser beams which have passed through the super-resolution cut-off filter, and wherein FIGS. 3D, 3E and 3F are two-dimensionally represented sectional views taken along A—A in FIGS. 3A, 3B and 3C, respectively;

DESCRIPTION OF THE PREFERRED EMBODIMENTS

Figure 1:
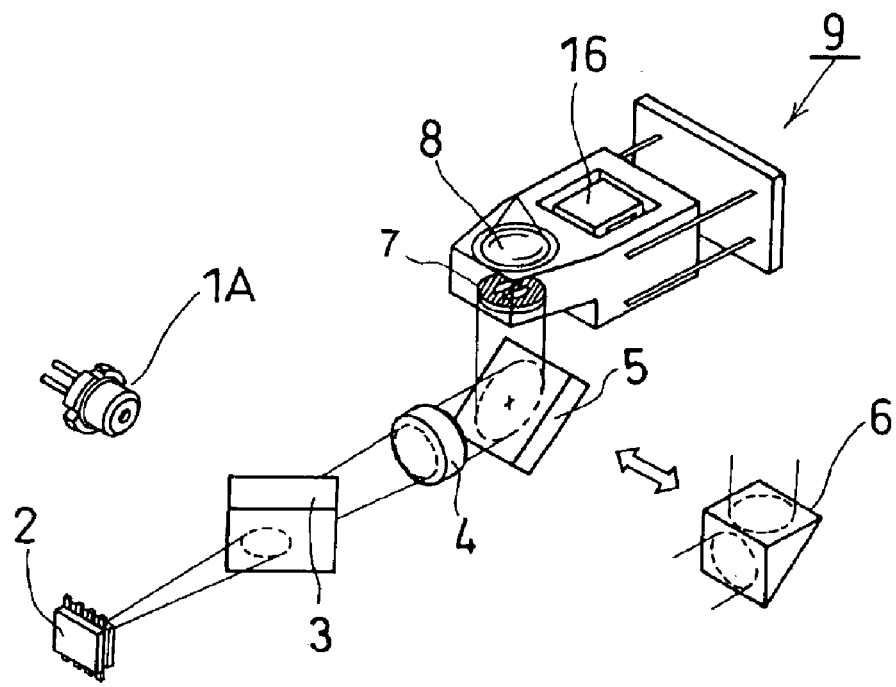
FIG. 1 is a block diagram showing the main section of an optical information reading apparatus according to the present invention.

FIG. 1 is a block diagram showing an embodiment of an optical information reading apparatus of the present invention using a super-resolution cut-off filter 7. There are provided a semiconductor laser (wavelength: 780 nm) 1A for a CD, and a beam splitter (half mirror) 3 which reflects and guides a laser beam emitted from the semiconductor laser 1A to a collimating lens 4, and which also transmits and makes a reflected laser beam returning from a disk (not shown) incident on a photodetector 2 corresponding to the wavelength of the reflected laser beam.

Also provided is a reflecting mirror 5 to guide the laser beam having passed through the collimating lens 4 to an objective lens 8 which converges the laser beam onto the disk (not shown). The disk, either a DVD-R or a DVD-RAM, is placed on a drive mechanism (not shown), and rotated thereby. The reflecting mirror 5 may be substituted by a prism-type reflecting mirror 6.

The objective lens 8 has a numerical aperture appropriate for a DVD. The aforementioned super-resolution cut-off filter 7, which will be further described later, is disposed immediately in front of the incident side of the objective lens 8. An actuator 9 comprises the objective lens 8, the super-resolution cut-off filter 7 and a control circuit 16, and is moved by a driving means (not shown) relative to the surface of the disk (not shown) disposed above the objective lens 8.

The laser beam having passed through the objective lens 8 is focused on the surface of the disk (not shown) as described later and reflected thereat. The reflected laser beam takes the incoming path backward, passes through the beam splitter 3, is received by the photodetector 2, and converted thereby into an electrical signal. The photodetector 2 is a well-known eight-division photodetector with a signal processing circuit, reads out recorded information and outputs tracking and focusing control signals to the control circuit 16.

The optical information reading apparatus shown in FIG. 1 will operate as follows. The laser beam from the semiconductor laser (wavelength: 780 nm) 1A for a CD is reflected at the beam splitter 3 and made incident on the collimating lens 4. The laser beam has its diffusion angle collimated by the collimating lens 4 to form into a parallel pencil, has its optical path changed by the reflecting mirror 5, and is made incident on the super-resolution cut-off filter 7. As described later, the incident laser beam is separated into a 0-th order laser beam and ± n-th order laser beams (n: an integral number), which are made incident on the objective lens 8. The 0-th order laser beam and ± primary laser beams incident on the objective lens 8 are converged onto the recording surface of the disk (not shown) as described later to be utilized for reading recorded information and controlling focussing and for controlling tracking, respectively.

The laser beam reflected at the disk (not shown) takes the incoming path backward, passes through the objective lens 8 and the super-resolution cut-off filter 7, and is made incident on the reflecting mirror 5. The laser beam has its optical path changed by the reflecting mirror 5, is converged by the collimating lens 4, passes through the beam splitter 3, is made incident on the photodetector 2, converted thereby into an electrical signal using a well-known method such that signals for recorded information and for focusing control are separated from the 0-th order laser beam while a signal for tracking control is separated from the ± primary laser beams, and is outputted from the photodetector 12. The disk is controlled by a well-known control circuit and the signals are read out by a well-known signal processing circuit (both circuits not shown).

Figure 2:
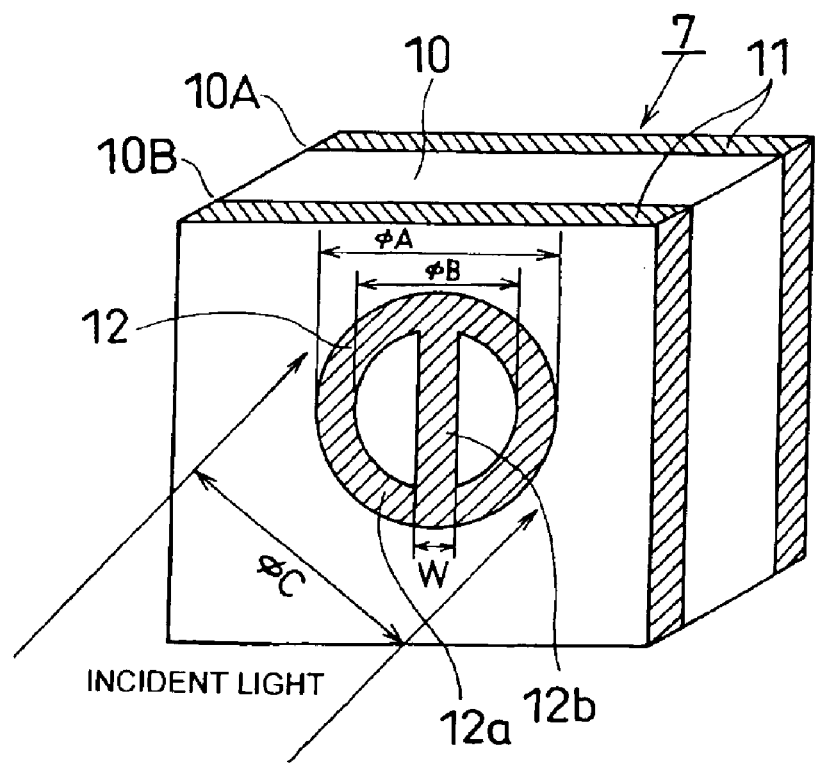
FIG. 2 is a perspective view showing a super-resolution cut-off filter according to an embodiment of the present invention.

Referring to FIG. 2, the super-resolution cut-off filter 7 according to the present invention includes two anti-reflection films 11 each comprising a single-layer or multi-layer of a dielectric material such that one is formed entirely on one surface 10A of a plate glass 10, and the other is formed partly on the other surface 10B, specifically, formed at portions except an annular portion 12$a$ provided at the central portion and a straight portion 12$b$ substantially corresponding to the inner diameter of the annular portion 12$a$. A metallic reflection film 12 as a reflecting means is provided at the annular portion 12$a$ and the straight portion 12$b$. Here, a relation of $\Phi C > \Phi A > \Phi B > W$ is established, where ΦA is the outer diameter of the annular portion 12a, ΦB is the inner diameter thereof, W is the width of the straight portion 12b, and ΦC is the diameter of a laser beam incident on the super-resolution cut-off filter 7. The reflecting means provided on the plate glass 10 is not limited to a metallic reflection film, but may be a reflection or absorption film of a dielectric material.

Figure 3A:
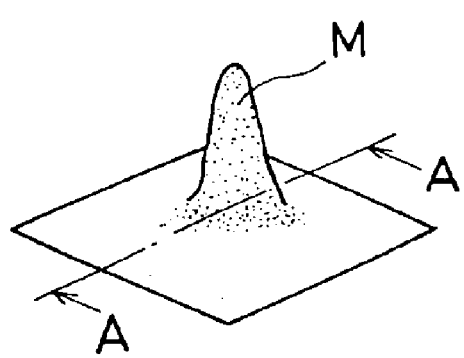
Figure 3B:
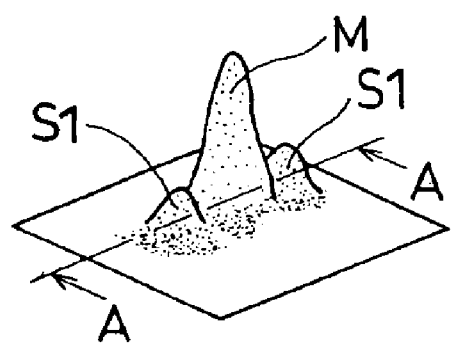
Figure 3C:
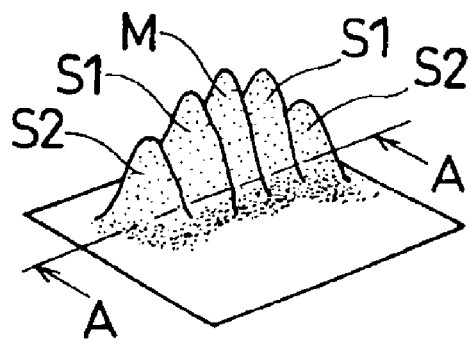
Figure 3D:
Figure 3E:
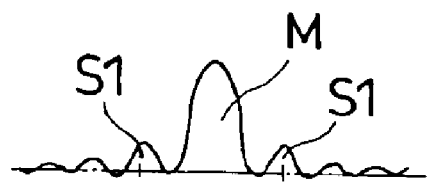
Figure 3F:

FIGS. 3A to 3F are characteristic views showing how the laser beam which has passed through the super-resolution cut-off filter 7 is separated into a 0-th order laser beam M and n-th order laser beams Sn (n: an integral number) under the following conditions ΦB=4.5 mm, ΦA=5 mm, and ΦC=6 mm with the W being set to 0 mm, 1.4 mm and 3.2 mm in FIGS. 3A, 3B and 3C, respectively, and to 0 mm, 1.4 mm and 3.2 mm in FIGS. 3D, 3E and 3F, respectively. As can be seen from FIGS. 3A to 3F, a laser beam is separated into a 0-th order laser beam and ± n-th order laser beams due to the straight portion 12b, and further the amplitude and number of the ± n-th order light beams and the width of the 0-th order light beam vary depending on the width W of the straight portion 12b (i.e., the beam cut-off width). Thus, the presence of the straight portion 12b produces the 0-th order laser beam for reading out information on a disk and for performing a focussing control, and the ± n-th order laser beams for performing a tracking control of the disk. Also, reduction in the width of the 0-th order laser beam enables the super-resolution cut-off filter to comply with a higher-density disk.

Figure 4:
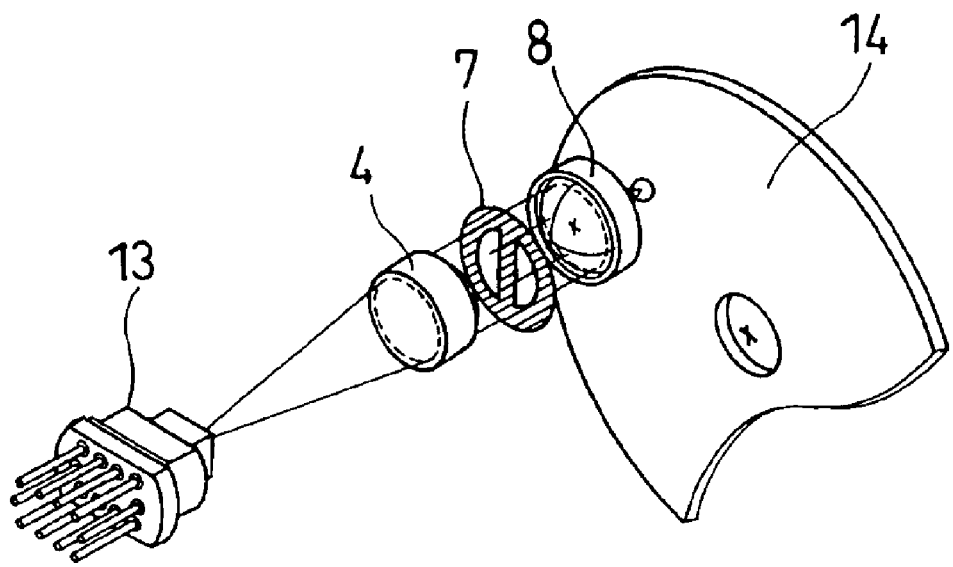
FIG. 4 is a perspective view showing a measuring device for a 0-th order laser beam, ± primary laser beams and ± secondary laser beams from the super-resolution cut-off filter.

Referring to FIG. 4, a laser beam from a holographic optical element 13 with a well-known semiconductor 1B mounted thereon is made incident on a collimating lens 4. The laser beam has its diffusion angle changed by the collimating lens 4 to get into a parallel pencil and is made incident on a super-resolution cut-off filter 7, on an objective lens 8, and then on the recording surface of a disk 14. The laser beam made incident on the recording surface of the disk 14 has its light intensity ratio measured by a detector (not shown).

Figure 5:
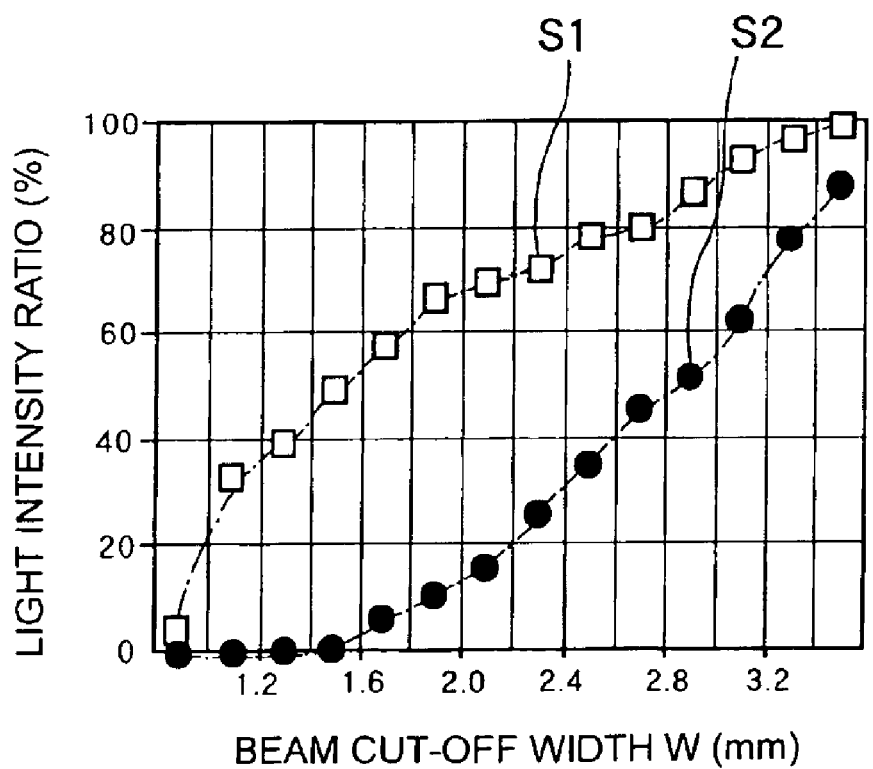
FIG. 5 is a diagram showing the measuring results by the measuring device in FIG. 4.

In FIG. 5, the horizontal axis designates the beam cut-off width W, and the vertical axis designates the light intensity ratio (%) of each of primary laser beams S1 and secondary laser beams S2 with respect to the intensity of a 0-th order laser beam M taken as 100%. As can be seen from FIG. 5, when the super-resolution cut-off filter 7 is desired to produce only the primary laser beams S1, the beam cut-off width W is set to 2 mm or smaller, thereby eliminating or diminishing the influence of the secondary laser beams S2. On the other hand, when the super-resolution cut-off filter 7 is employed in an application to require the secondary laser beams S2, the beam cut-off width W is set to 3.2 mm or larger, thereby making the intensity of the secondary laser beams S2 comparable to that of the primary laser beams S1. Since, this embodiment according to the present invention uses the 0-th order laser beam M and the ± primary laser beams S1 only, the beam cut-off width W is desirably set to 2.0 mm or smaller.

Figure 6A:
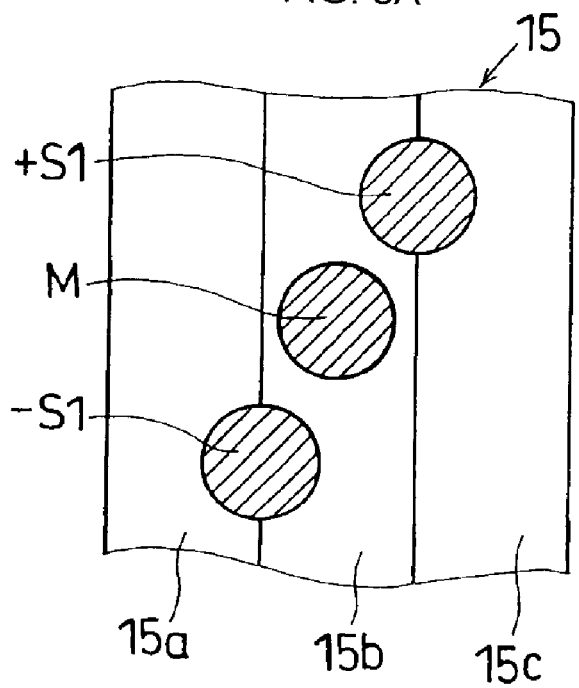
FIG. 6A is a diagram explaining the positional relation of the 0-th order laser beam and the ± primary laser beams from the super-resolution cut-off filter with respect to a disk.

FIG. 6A shows the positional relation of the 0-th order laser beam M, the + primary laser beam +S1 and the − primary laser beam −S1 with respect to the disk. In FIG. 1, the semiconductor 1A for a CD and the super-resolution cut-off filter 7 are disposed at predetermined positions so that the laser beams M, +S1 and −S1 are incident on respective positions at a land 15b and grooves 15a and 15c of a disk 15 as shown in FIG. 6A.

Specifically, among the laser beams generated by the super-resolution cut-off filter 7, the 0-th order laser beam M is made incident on the land 15b, and the + primary laser beam +S1 and the − primary laser beam −S1 are made incident on the grooves 15a and 15c, respectively. The laser beams made incident on the land 15b and the grooves 15a and 15c are converted separately into the recorded information signal and the control signals by a well-known method. And, using a well-known method, the information signal recorded in the disk and the focusing control signal are acquired from the land 15b, and the tracking control signal is acquired from the grooves 15a and 15c, and then these signals are duly processed.

Figure 6B:
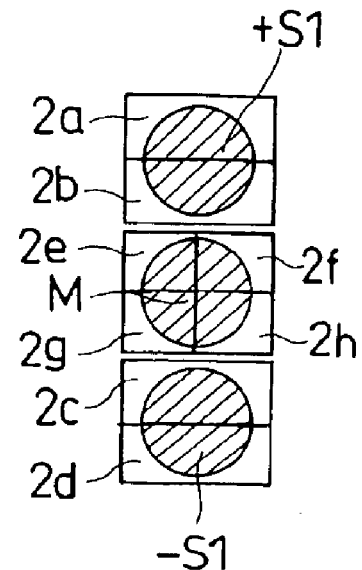
FIG. 6B is a diagram explaining the positional relation of the 0-th order laser beam and the ± primary laser beams with respect to a photodetector.
Figure 7:
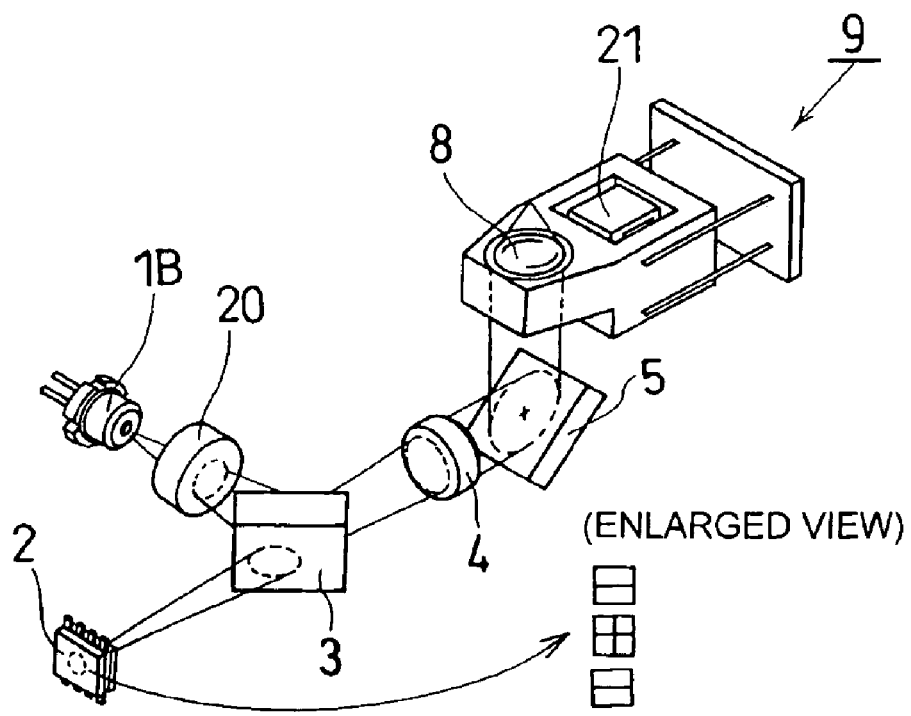
FIG. 7 is a block diagram showing the main section of a conventional optical information reading apparatus.

FIG. 6B shows the positional relation of the laser beams M, +S1 and −S1 reflected at the land 15b and the grooves 15a and 15c with respect to the photodetector 2. The photodetector 2 is a well-known eight-division photodetector, in which divisions 2a and 2b detect the + primary laser beam +S1, divisions 2e to 2h detect the 0-th order laser beam M, and divisions 2c and 2d detect the − primary laser beam −S1.

In the embodiment according to the present invention, the ± primary laser beams are utilized to perform the tracing control, but other ± n-th order laser beams than the ± primary laser beams may be utilized, depending on the method of tracking control.

What is claimed is:

1. An optical information reading apparatus comprising:
   a semiconductor laser;
   a beam splitter adapted to split a laser beam emitted from the semiconductor laser and a reflected laser beam returning from a recording medium;
   a collimating lens adapted to change a diffusion angle of the laser beam;
   a super-resolution cut-off filter, the super-resolution cut-off filter adapted to separate the laser beam into a 0-th order laser beam and ± n-th order laser beam, the ± n-th order laser beams being utilized to perform a tracking control;
   an objective lens positioned immediately after the super-resolution cut-off filter, having a numerical aperture appropriate for reading information recorded on the recording medium, and adapted to converge the 0-th order laser beam and the ± n-th order laser beams generated by the super-resolution cut-off filter onto the recording medium; and
   a photodetector for detecting the reflected laser beam from the recording medium, wherein the super-resolution cut-off filter has on its central portion a reflecting means comprising an annular portion and a straight portion substantially corresponding to an inner diameter of the annular portion.

2. An optical information reading apparatus according to claim 1, wherein the super-resolution cut-off filter includes a plurality of anti-reflection films and a reflecting member that includes an annular portion and a straight portion,
   one of the anti-reflection films is provided on a first side surface of the super-resolution cut-off filter,
   a second side surface of the super-resolution cut-off filter has another of the anti-reflection films arranged on a first portion thereof and the reflecting member arranged on a second portion thereof,
   the anti-reflection films each comprise at least one layer of at least one dielectric material, and
   the reflecting member is formed of at least one of a metallic reflection film and a reflection or absorption film of a dielectric material.

3. An optical information reading apparatus according to claim 1, wherein ± primary laser beams generated by the super-resolution cut-off filter are utilized to perform the tracking control.

4. An optical information reading apparatus comprising:
a semiconductor laser;
a beam splitter adapted to split a laser beam emitted from the semiconductor laser and a reflected laser beam returning from a recording medium;
a collimating lens adapted to change a diffusion angle of the laser beam;
a super-resolution cut-off filter, the super-resolution cut-off filter adapted to separate the laser beam into a 0-th order laser beam and ± n-th order laser beams, the ± n-th order laser beams being utilized to perform a tracking control;
an objective lens positioned immediately after the super-resolution cut-off filter, having a numerical aperture appropriate for reading information recorded on the recording medium, and adapted to converge the 0-th order laser beam and the ± n-th order laser beams generated by the super-resolution cut-off filter onto the recording medium; and
a photodetector for detecting the reflected laser beam from the recording medium, wherein:
the super-resolution cut-off filter includes a plurality of anti-reflection films and reflecting member that includes an annular portion and a straight portion,
one of the anti-reflection films is provided on a first side surface of the super-resolution cut-off filter,
a second side surface of the super-resolution cut-off filter has another of the anti-reflection films arranged on a first portion thereof and the reflecting member arranged on a second portion thereof,
the anti-reflection films each comprise at least one layer of at least one dielectric material, and
the reflecting member is formed of at least one of a metallic reflection film and a reflection or absorption film of a dielectric material.

5. An optical information reading apparatus according to claim 4, wherein ± primary laser beams generated by the super-resolution cut-off filter are utilized to perform the control.

* * * * *